Oct. 11, 1938.     I. F. SCHRECK ET AL     2,132,973
CASTER CONTROL MEANS FOR MOVABLE TRUCKS AND THE LIKE
Filed June 26, 1937     2 Sheets-Sheet 1

INVENTORS
Irvin F. Schreck,
Chester S. Mann,
BY
ATTORNEY

WITNESS

Oct. 11, 1938. I. F. SCHRECK ET AL 2,132,973
CASTER CONTROL MEANS FOR MOVABLE TRUCKS AND THE LIKE
Filed June 26, 1937 2 Sheets-Sheet 2

WITNESS
F. J. Hartman

INVENTORS
Irvin F. Schreck,
Chester S. Mann.
BY
ATTORNEY

Patented Oct. 11, 1938

2,132,973

UNITED STATES PATENT OFFICE 2,132,973

CASTER CONTROL MEANS FOR MOVABLE TRUCKS AND THE LIKE

Irvin F. Schreck, Cleveland, Ohio, and Chester S. Mann, Manheim, Pa., assignors to Bond Foundry & Machine Company, Manheim, Pa., a corporation of Pennsylvania Application June 26, 1937, Serial No. 150,514

7 Claims. (Cl. 280—49)

This invention relates to movable trucks, racks and similar vehicles for transporting articles over short distances, such as about a shop or mill, and is especially directed to the provision in a truck or the like having swivel casters of means associated with a longitudinally aligned pair of the casters for selectively locking one of them in position to facilitate control of the direction of movement of the truck.

As is well known, when all the casters on a truck of this general character are free to swivel it is difficult to guide it, especially when it is being pushed from the rear, and our invention therefore contemplates the locking of a caster at the leading end of the truck so as to constrain the wheel of this caster to rotate only in a plane parallel to the sides of the truck and thereby facilitate accurate control of its direction of travel when it is being manipulated from the opposite end. The invention further contemplates the provision at each end of the truck of a folding push bar which when in operative position affords a convenient hand grip for the operator when moving and guiding the truck and which automatically brings about the locking of a caster at the opposite end as the bar is brought to that position or subsequently thereto and automatically unlocks it when the bar is returned to inoperative position.

A principal object of the invention, therefore, is to provide in a truck or similar vehicle having a pair of swivel casters, control means associated therewith operable from either end of the truck to lock the caster at the opposite end in such manner as to constrain its wheel to rotate only in a plane parallel to the sides of the truck.

A further object is to provide mechanism including a push bar attached to the truck which is effective when brought to operative position to actuate the caster locking mechanism to automatically place one caster in locked or in potentially locked condition and when returned to inoperative position to automatically relieve such condition and thereby unlock the caster if previously locked.

Another object of the invention is to provide in a movable truck a pair of swivel casters respectively disposed at its opposite ends and means for selectively locking either caster against swivelling so interconnected as to be normally in balanced relation with neither caster locked, in combination with mechanism disposed at the ends of the truck operable when actuated to bring about the locking of the caster at the opposite end through upsetting this balanced relation and simultaneously to so position the mechanism as to substantially prevent its operation from said opposite end prior to its restoration to normal position.

A still further object is to provide an improved swivel caster for incorporation in mechanism of the character described which comprises a swivel plate locking plunger sildable in a substantially cylindrical housing under the influence of suitable yielding means and an arm extending outwardly from the plunger through a slot in the housing adapted to be engaged by suitable actuating mechanism whereby the plunger can be moved.

Another object is to provide in control mechanism for swivel casters of the character aforesaid an improved actuating lever embodying a cam surface for engaging the locking plunger actuating arm in one way to move it longitudinally of the truck and another surface for engaging the said arm in a different way to limit pivotal movement of the lever in one direction.

Other objects, purposes and advantages of the invention will hereinafter more fully appear or will be understood from the following description of one illustrative embodiment thereof which is at present preferred and is shown in the accompanying drawings, in which Fig. 1 is a fragmentary side elevation partly in vertical section of a truck equipped with our improved caster control mechanism.

In the several figures like characters are used to designate the same parts.

Figure 1:
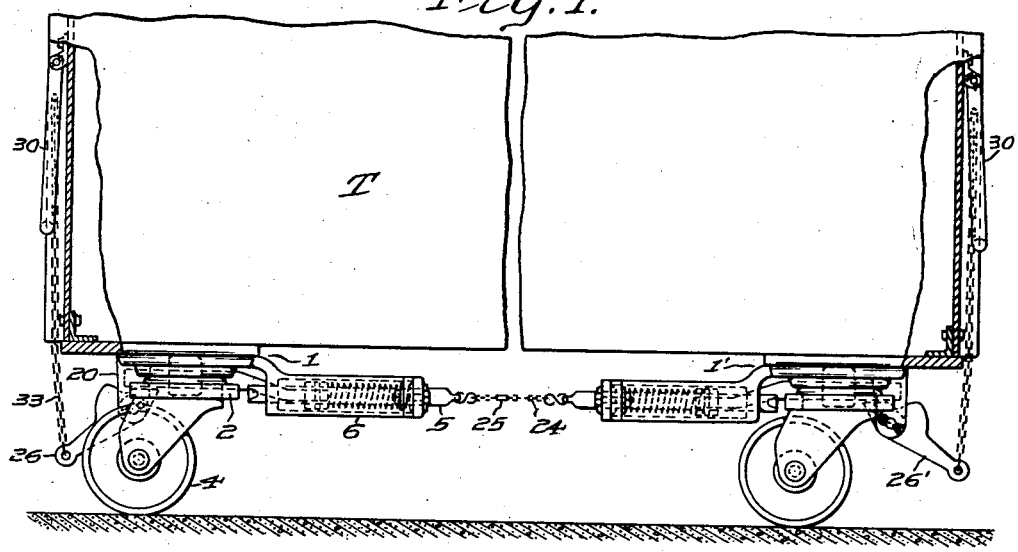
Figure 2:
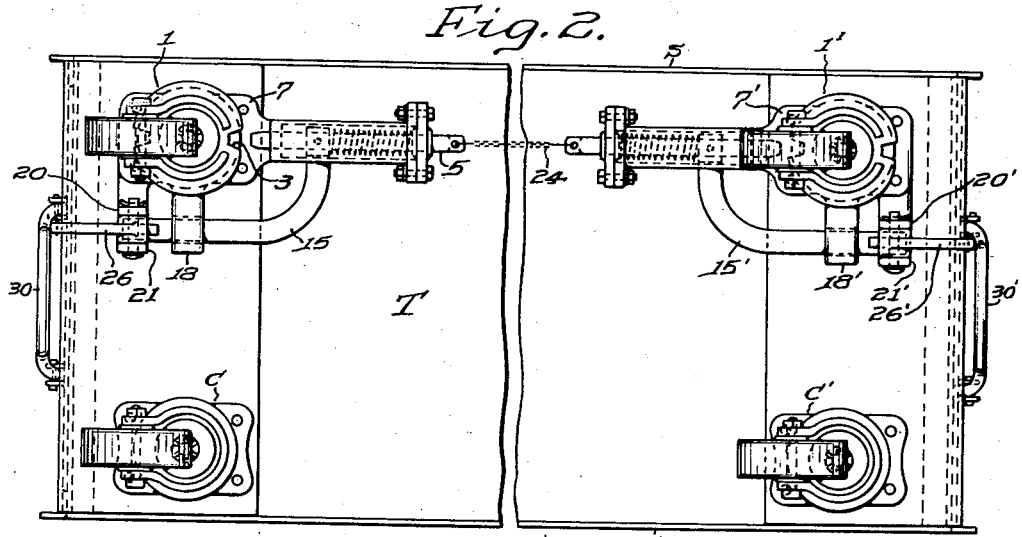
Fig. 2 is a bottom plan view of the truck.

More particularly the truck T, the detailed construction of which is not material, represents any truck or other vehicle adapted for support from swivel casters and is provided with four such casters respectively located adjacent its several corners. Two of the casters C, C' may be of any desired character and require no specific reference since they form no part of the invention, while each of the other pair I, I' hereinafter more fully described, comprises a swivel plate 2 having a pair of diametrically opposed, substantially rectangular notches 3 disposed in the plane of rotation of its caster wheel 4. These notches are selectively adapted for reception of one end of a locking plunger 5 which when inserted in either notch prevents movement of the swivel plate about its axis and thus maintains the plane of rotation of the wheel parallel with the sides *s* of the truck.

This locking plunger is supported for sliding movement relatively to the swivel plate, conveniently in a sleeve 6 preferably formed integrally with the caster base plate 7 which latter is substantially similar to but in certain respects the reverse of the base plate 7' of the caster 1'. The sleeve 6 is provided at its outer end with a head 8 through which the rear end of the plunger extends and which is secured to the sleeve by bolts 9 and nuts 10 projecting through ears 11 on the head and corresponding lugs 12 on the sleeve and has a longitudinal horizontal slot 14 extending from adjacent its inner end to its outer end on one side and continuing through the lug 12 on that side to receive one of the bolts 9 holding the head to the sleeve. Between the lug and the inner end of the sleeve the slot forms a passage for a curved arm 15 secured to the plunger within the sleeve by a taper pin 16 or the like; the opposite end of the arm extends loosely and parallel to the plunger through an apertured lug 18 integral with the base plate and thence between depending ears 20, 21 in alignment with the lug aperture for a purpose which will hereinafter appear, and a coil spring 22 is interposed between the arm and the sleeve head about the plunger and continuously urges it and the arm toward the adjacent swivel plate. The outer ends of both plungers, which project beyond the sleeve heads, are interconnected beneath the truck by a chain 24 or similar non-stretchable but flexible connecting member in which may be interposed a turn buckle 25 for adjusting its length in such manner that the plungers and their respective springs are normally maintained in balanced relation with both plungers free of engagement with the swivel plates but capable of movement in both directions relatively thereto to allow the inner end of either plunger to engage the adjacent plate and to enter either of the notches 3 therein when such notch is aligned with it.

Figure 5:
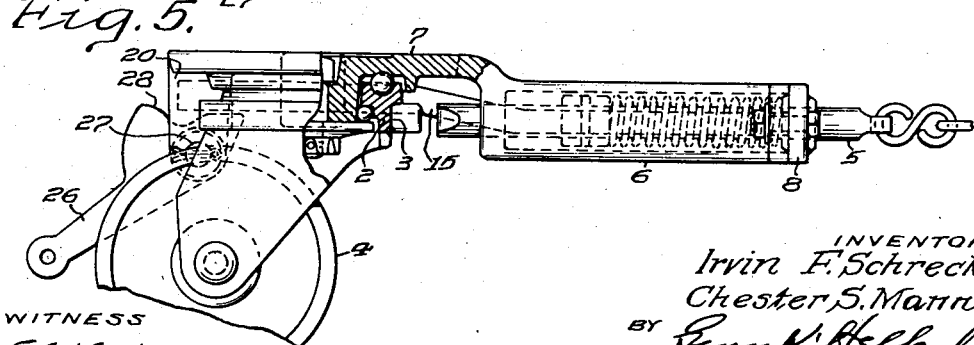
Fig. 5 is a similarly enlarged side elevation thereof partly in vertical section with the several elements in the positions they assume when the casters at both ends of the truck are unlocked and therefore free to swivel.

Associated with each of the casters 1, 1' is actuating mechanism for upsetting the balanced relation of the plungers through movement of one of them away from its swivel plate to permit such movement of the other toward its swivel plate, and bring about the engagement of the plunger in one of the notches thereof to lock the latter plate and its caster wheel against swivelling. This mechanism comprises a lever 26 pivoted on a pin 27 between the ears 20, 21 and having a cam surface 28 adapted to engage the proximate end of the arm 15 to move it toward the opposite end of the truck when the lever is swung in one direction on its pivot and thereby move the adjacent plunger from the neutral position shown in Fig. 5 to the fully retracted position indicated in full lines in Fig. 6. This movement of the lever 26 about its pivot is effected through the operation of a substantially U-shaped push bar 30 pivoted to lugs 31, 32 on the adjacent end of the truck and a chain 33 interposed between the push bar and the lever, connecting them in such manner that raising the push bar on its pivot to bring it to substantially horizontal position for moving and guiding the truck also raises the lever to actuate the plunger arm. The lever 26 has an additional stop surface 35 adapted to engage the under face of that arm when the lever is free to move about its pivot in the opposite direction, as when the push bar is released, to thereby limit such movement of the lever and maintain it when at rest in proper position for subsequent actuation by raising the push bar.

The operation of the mechanism will readily be understood from the foregoing description, but it may be pointed out that whereas specific reference has been made principally to the several elements of the caster 1, the other caster, namely the caster 1', is of substantially similar construction except for the changes made to compensate for its different position on the truck. Thus its lug 18' and arm supporting ears 20', 21' project from its base plate 7' and receive the curved plunger arm 15' on the opposite side of the base plate as compared with the caster 1; in each caster, however, the slot 14 in the sleeve is on the same side of the sleeve as the arm. Consequently when both casters are fixed to the truck with their locking plungers in substantial alignment, the curved arms 15, 15' and actuating levers 26, 26' are also in substantial alignment and are thus respectively positioned for operation through their connections with the push bars 30, 30' which are usually disposed at about the middle of the truck ends and at a convenient height above the floor for using them to move and direct the truck when raised to substantially horizontal position.

Since the flexible element 24 forms the sole connection between the casters 1, 1' it is unnecessary that they be mounted on the truck in exact alignment with each other as they function substantially as well when slightly out of alignment as they do when perfectly aligned, while the provision of the turn buckle 25 or other length-regulating means in the element facilitates exact adjustment of its length after the casters have been initially secured in place or at any other time.

Our caster control mechanism is therefore adapted for large scale production in suitable stock sizes for trucks of different load capacities and the casters and mechanism may consequently be made and sold separately from the truck bodies and used on a wide variety of trucks, the only adjustments required to accommodate them to trucks of substantially like load capacities but of different dimensions being the fixing of the plunger-connecting chain at the proper length to maintain both plungers unlocked when the mechanism is at neutral or released position and the plunger springs thus balanced against each other, an operation readily effected by cutting the chain to approximately that length after the casters are mounted and then making the final adjustment with the turn buckle, it being obvious, however, that the chain must not be so short as to prevent either caster from being locked by its plunger and spring when the chain tension thereon is relaxed by movement of the other plunger away from its swivel plate.

Figure 6:
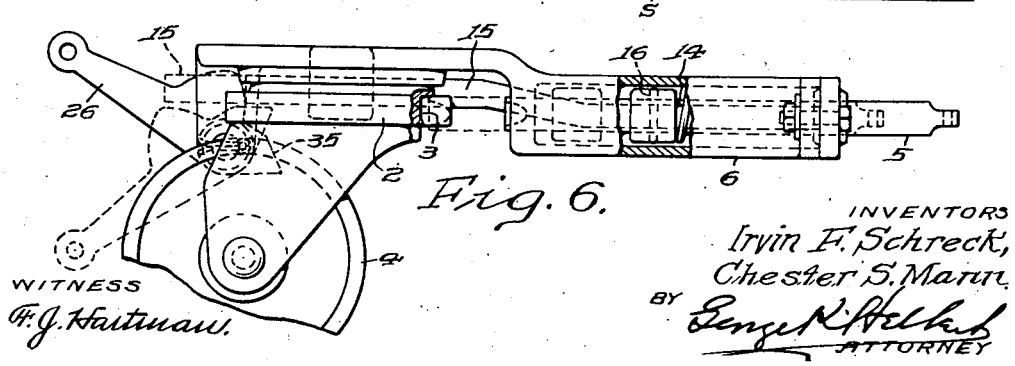
Fig. 6 is a view similar to Fig. 5 but showing these elements in different positions.
Figure 3:
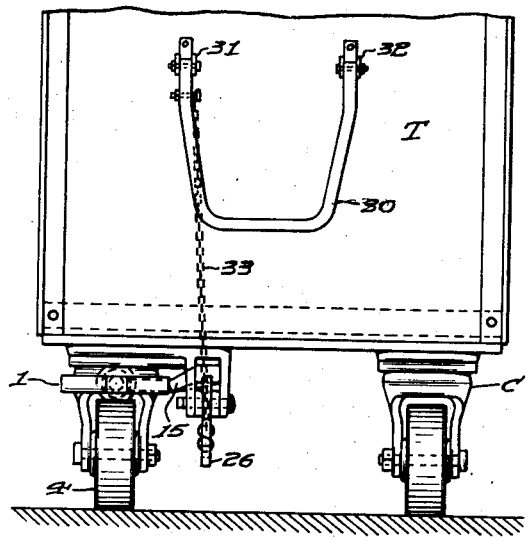
Fig. 3 is an end elevation thereof.
Figure 4:
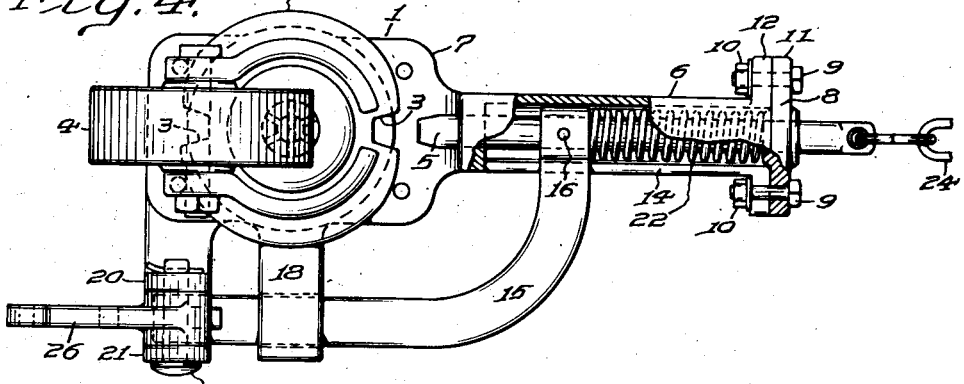
Fig. 4 is an enlarged bottom plan view partly in horizontal section of one of the casters on the truck shown in the preceding figures.

It will be evident from Fig. 6, showing in dotted lines the positions of parts of the caster 1 when its swivel plate is locked as by raising of the push bar 30' at the opposite end of the truck, that when the plunger 5 is seated in a notch in its swivel plate, its arm 15 overlies the cam surface 28 on the adjacent lever 26 and prevents unlocking of this caster by operation of the push bar 30 until the arm 15 is restored to neutral condition by release of the push bar 30' to bring the end of the arm 15 to a position such that it can be engaged by the cam surface 28; moreover the stop surface 35 can engage the lower face of the lever at any position of the latter to prevent the lever being dragged along the floor when it is released.

While we have herein specifically shown and described one illustrative embodiment of the invention which is practical for its intended purposes and at present preferred, it will be understood that changes and modifications in the form, structure and arrangement of the several mechanical elements utilized therein and their relation to the truck itself and to other elements of the mechanism, as well as other embodiments of the invention, will readily occur to those skilled in the art and may be made if desired without departing from its spirit and scope as defined in the appended claims.

Having thus described our invention, we claim and desire to protect by Letters Patent of the United States:

1. In a truck of the class described, a pair of swivel casters respectively disposed adjacent its opposite ends, each comprising a base plate, a notched swivel plate and a slotted sleeve carried by the base plate, a plunger slidable axially in the sleeve, an arm extending outwardly from the plunger through the sleeve slot, and yielding means urging the plunger toward the swivel plate, a flexible connection between the plungers adapted to normally maintain them in balanced relation substantially equidistantly spaced from their adjacent swivel plates, and means disposed adjacent the ends of the truck respectively cooperable with the plunger arms to move the adjacent plunger axially of its sleeve away from its swivel plate to thereby release the other plunger for movement toward its swivel plate under the influence of its yielding means.

2. In a truck of the class described, a pair of swivel casters respectively disposed adjacent its opposite ends, each comprising a base plate, a notched swivel plate and a slotted sleeve carried by the base plate with its axis substantially normal to that of the swivel plate, a plunger slidable axially in the sleeve and adapted to engage a notch in the swivel plate, an arm extending outwardly from the plunger through the sleeve slot, and yielding means urging the plunger toward the swivel plate, means yieldable in one direction and of fixed maximum length interconnecting the plungers for restraining movement of each away from the other, and means respectively operable on the arms for moving each plunger in opposition to its yielding means toward the other plunger to release the latter for movement by its yielding means toward its adjacent swivel plate to engage the notch therein and releasably lock said plate against swiveling.

3. In a truck of the class described, a pair of swivel casters respectively disposed adjacent its opposite ends, each comprising a base plate, a notched swivel plate and a slotted sleeve carried by the base plate with its axis substantially normal to that of the service plate, a plunger slidable axially in the sleeve, an arm extending outwardly from the plunger through the sleeve slot, and yielding means urging the plunger toward the swivel plate, longitudinally non-rigid means interconnecting the plungers adapted to restrain movement of each away from the other beyond a predetermined distance, a pivoted cam carried by each base plate operable to engage the adjacent arm to move it longitudinally of the truck to slide its plunger in opposition to its yielding means, a push bar pivoted adjacent the end of the truck, and means interconnecting the push bar and cam for moving it in one direction on its pivot in correspondence with the pivotal movement of the push bar.

4. In a truck of the class described, a pair of swivel casters respectively disposed adjacent its opposite ends, each comprising a base plate, a notched swivel plate and a slotted sleeve carried by the base plate, a plunger slidable axially in the sleeve, an arm extending outwardly from the plunger through the sleeve slot, and yielding means urging the plunger toward the swivel plate, a connection between the plungers having a fixed maximum length and a variable minimum length normally operative to maintain both plungers in spaced relation to the swivel plates, and means disposed adjacent the ends of the truck respectively operable to move the adjacent arm toward the opposite end of the truck to thereby release the plunger adjacent such opposite end for movement toward its swivel plate and into engagement in a notch therein to lock the plate against swiveling.

5. In caster control mechanism a pair of casters respectively comprising notched caster swivel plates, a plunger adapted to enter a notch in each plate, non-rigid tension means interconnecting the plungers operative to normally hold them out of engagement with the plates, yielding means independently urging the plungers toward their respective plates, and manually operable means associated with each plunger for moving it away from its plate in opposition to said yielding means to thereby release the other plunger for movement toward its plate under the influence of its yielding means.

6. In combination with a truck of the class described, a pair of swivel casters having notched swivel plates, locking plungers respectively adapted to enter the notches in the plates, yielding means urging each plunger toward its adjacent plate, a lever mounted adjacent each caster comprising means operable to move the adjacent plunger longitudinally in response to the movement of the lever, flexible means of predetermined length interconnecting the plungers, a push bar pivoted adjacent each end of the truck, and means interconnecting each push bar with the adjacent lever operable to actuate the latter in response to movements of the bar.

7. In combination with a truck of the class described, a pair of swivel casters having notched swivel plates, locking plungers respectively adapted to enter the notches in the plates, flexible means of fixed maximum length interconnecting the plungers, a push bar disposed adjacent each end of the truck and movable between operative and inoperative positions, yielding means urging each plunger toward its adjacent swivel plate and connections between each push bar and the adjacent plunger for moving the latter away from its swivel plate when the bar is moved to operative position to thereby release the plunger adjacent the other swivel plate for movement toward the latter under the influence of its yielding means and into locking relation therewith when said plate is in a predetermined position and into potentially locked relation thereto when the plate is in any other position.

IRVIN F. SCHRECK.
CHESTER S. MANN.

CERTIFICATE OF CORRECTION.

Patent No. 2,132,973.

October 11, 1938.

IRVIN F. SCHRECK, ET AL.

It is hereby certified that error appears in the printed specification of the above numbered patent requiring correction as follows: Page 3, first column, line 67, claim 3, for the word "service" read swivel; and that the said Letters Patent should be read with this correction therein that the same may conform to the record of the case in the Patent Office.

Signed and sealed this 15th day of November, A. D. 1938.

Henry Van Arsdale (Seal)

Acting Commissioner of Patents.